(12) United States Patent
Smith

(10) Patent No.: US 9,838,956 B2
(45) Date of Patent: Dec. 5, 2017

(54) IDENTIFICATION OF MOBILE NODES IN WLAN COMMUNICATIONS

(71) Applicant: SR Technologies, Inc., Davie, FL (US)

(72) Inventor: Graham K. Smith, Boca Raton, FL (US)

(73) Assignee: SR Technologies, Inc., Davie, FL (US)

( * ) Notice: Subject to any disclaimer, the term of this patent is extended or adjusted under 35 U.S.C. 154(b) by 0 days.

(21) Appl. No.: 15/446,454

(22) Filed: Mar. 1, 2017

(65) Prior Publication Data

US 2017/0257821 A1    Sep. 7, 2017

Related U.S. Application Data

(60) Provisional application No. 62/302,488, filed on Mar. 2, 2016.

(51) Int. Cl.
| | |
|---|---|
| *H04W 24/00* | (2009.01) |
| *H04W 48/16* | (2009.01) |
| *H04L 12/26* | (2006.01) |
| *H04W 84/12* | (2009.01) |
| *H04L 29/12* | (2006.01) |

(52) U.S. Cl.
CPC ............. *H04W 48/16* (2013.01); *H04L 43/18* (2013.01); *H04L 61/6022* (2013.01); *H04W 84/12* (2013.01)

(58) Field of Classification Search
CPC ...... H04W 48/16; H04W 84/12; H04L 43/18; H04L 61/6022
See application file for complete search history.

(56) References Cited

U.S. PATENT DOCUMENTS

| | | | | |
|---|---|---|---|---|
| 2010/0303047 A1* | 12/2010 | Ibrahim | ................ | H04W 4/001 370/338 |
| 2012/0054493 A1* | 3/2012 | Bradley | ................ | H04W 8/005 713/171 |
| 2013/0201980 A1* | 8/2013 | Rahul | ................... | H04W 88/08 370/338 |
| 2014/0313983 A1* | 10/2014 | Onno | .................... | H04L 63/105 370/328 |
| 2014/0369330 A1* | 12/2014 | Sinha | .................... | H04W 8/005 370/338 |
| 2015/0230093 A1* | 8/2015 | Park | ....................... | H04W 12/08 726/4 |

(Continued)

*Primary Examiner* — Ajit Patel
(74) *Attorney, Agent, or Firm* — Christopher & Weisberg, P.A.

(57) ABSTRACT

A method and a node identification system for identifying at least one unknown mobile node in a communications network using details related to at least one known mobile node and organization of the details related to the at least one known mobile node. The method includes capturing details related to the at least one unknown mobile node and identifying an organization of the captured details related to the at least one unknown mobile node, comparing the details related to the at least one known mobile node and the organization of the details related to the at least one known mobile node with the captured details related to the at least one unknown mobile node and the organization of the captured details related to the at least one unknown mobile node, and determining a type of the at least one unknown mobile node based on the comparing.

18 Claims, 12 Drawing Sheets

(56) References Cited

U.S. PATENT DOCUMENTS

| | | | |
|---|---|---|---|
| 2015/0271745 A1* | 9/2015 | Knowles | H04W 8/24 370/254 |
| 2015/0334638 A1* | 11/2015 | Kim | H04W 48/14 370/329 |
| 2016/0219463 A1* | 7/2016 | Mestanov | H04W 28/08 |
| 2016/0219548 A1* | 7/2016 | Lindheimer | H04W 48/08 |

* cited by examiner

⊞ Frame 123: 155 bytes on wire (1240 bits), 155 bytes captured (1240 bits) on interface 0
⊞ Radio tap Header v0, Length 26
⊟ IEEE 802.11 Probe Request, Flags: ........c
    Type/Subtype: Beacon frame (0x0004)
  ⊟ Frame Control Field: 0x4000
    .000 0000 0000 0000 = Duration: 0 microseconds
    Receiver address: Broadcast (ff:ff:ff:ff:ff:ff)
    Destination address: Broadcast    (ff:ff:ff:ff:ff:ff)
    Transmitter address:  (ec:1f:72:79:da:4f)
    Source address: (ec:1f:72:79:da:4f)
    BSS ID: (ff:ff:ff:ff:ff:ff)
    Fragment number: 0
    Sequence number: 979
  ⊞ Frame check sequence: 0xae85a1fc [correct]
⊟ IEEE 802.11 wireless LAN management frame
  ☐ Tagged Parameters (101 bytes)
    ⊞ Tag: SSID parameter set: Broadcast
    ⊞ Tag: Supported Rates 1, 2, 5.5, 11, [Mbit/sec]
    ⊞ Tag: Extended Supported Rates 6, 9, 12, 24, 36, 48, 48, [Mbit/sec]
    ⊞ Tag: DS parameter set: Current Channel: 6
    ⊞ Tag: HT Capabilities (802.11n D1.10)
    ⊟ Tag: Extended capabilities (8 octets)
        Tag: Number: Extended Capabilities (127)
        Tag length: 8
      ⊞ Extended Capabilities: 0x00 (octet 1)
      ⊞ Extended Capabilities: 0x00 (octet 2)
      ⊞ Extended Capabilities: 0x08 (octet 3)
      ⊞ Extended Capabilities: 0x80 (octet 4)
      ⊞ Extended Capabilities: 0x01 (octet 5)
      ⊞ Extended Capabilities: 0x40 (octet 6)
      ⊞ Extended Capabilities: 0x00 (octet 7)
      ⊞ Extended Capabilities: 0x40 (octet 8)
    ⊞ Tag: Vendor Specific: Epigram
    ⊞ Tag: Vendor Specific: Microsoft: unkown 8
    ⊞ Tag: Vendor Specific: B...

(Prior Art)

*FIG. 3*

⊞ Frame 123: 155 bytes on wire (1240 bits), 155 bytes captured (1240 bits) on interface 0
⊞ Radio tap Header v0, Length 26
⊟ IEEE 802.11 Probe Request, Flags: ........c
   Type/Subtype: Beacon frame (0x0004)
 ⊞ Frame Control Field: 0x4000
   .000 0000 0000 0000 = Duration: 0 microseconds
   Receiver address: Broadcast (ff:ff:ff:ff:ff:ff)
   Destination address: Broadcast (ff:ff:ff:ff:ff:ff)
   Transmitter address:  (ec:1f:72:79:da:4f)
   Source address:  (ec:1f:72:79:da:4f)
   BSS ID: (ff:ff:ff:ff:ff:ff)
   Fragment number: 0
   Sequence number: 979
 ⊞ Frame check sequence: 0xae85a1fc [correct]
⊞ IEEE 802.11 wireless LAN management frame
⊟ Tagged Parameters (101 bytes)
   ⊞ Tag: SSID parameter set: Broadcast
   ⊞ Tag: Supported Rates 1, 2, 5.5, 11, [Mbit/sec]
   ⊞ Tag: Extended Supported Rates 6, 9, 12, 18, 24, 36, 48, 54, Mbit/sec]
   ⊞ Tag: DS parameter set: Current Channel: 6
   ⊟ Tag: HT Capabilities (802.11n D1.10)
      Tag Number: HT Capabilities (802.11n D1.10) (45)
      Tag length: 26
    ⊞ HT Capabilities Info: 0x002d
    ⊞ A-MPDU Parameters: 0x17
    ⊟ Rx Supported Modulation and Coding Scheme Set: MCS Set
     ⊟ Rx Modulation and Coding Scheme (one bit per modulation): 2 spatial streams
            .... .... .... .... .... .... 1111 1111 = Rx Bitmask Bits 0-7: 0x000000ff
            .... .... .... .... 1111 1111 .... .... = Rx Bitmask Bits 8-15: 0x000000ff
            .... .... 0000 0000 .... .... .... .... = Rx Bitmask Bits 16-23: 0x00000000
            0000 0000 .... .... .... .... .... .... = Rx Bitmask Bits 24-31: 0x00000000
            .... .... .... .... .... .... .... ...1 = Rx Bitmask Bits 32: 0x00000000
            .... .... .... .... .... .... .000 000. = Rx Bitmask Bits 33-38: 0x00000000
            .... .... ...0 0000 0000 0000 0... .... = Rx Bitmask Bits 39-52: 0x00000000
            ...0 0000 0000 0000 0000 0000 000. .... = Rx Bitmask Bits 53-76: 0x00000000
            .... ..00 0000 0000 = Highest Supported Data Rate: 0x0000
            .... .... .... ...0 = Tx Supported MCS Set: Not Defined
            .... .... .... ..0. = Tx and Rx MCS Set: Equal
            .... .... .... 00.. = Maximum Number of Tx Spatial Streams Supported: 0X0000, Tx MCS Set Not Defined
            .... .... ...0 .... = Unequal Modulation: Not Supported
    ⊞ HT Extended Capabilities: 0x0c00
    ⊞ Transmit Beam Forming (TxBF) Capabilities: 0x00000000
    ⊞ Antenna Selection (ASEL) Capabilities: 0x00
   ⊞ Tag: Extended Capabilities (8 octet)
   ⊞ Tag: Vendor Specific: Epigram
   ⊞ Tag: Vendor Specific: Microsoft: unkown 8
   ⊞ Tag: Vendor Specific: B...

(Prior Art)

| CUI | M | M | S | S | S | M |
|---|---|---|---|---|---|---|
| Rest of MAC Address | 73 1e 3e | d1 93 5a | 21 51 97 (unknown) | 01 ee 1c | 2b c2 ec | 13 29 a2 | 79 da 4f |
| Chipset | B... | B... | B... | B... | B... | B... |
| Modes | b/g/n | b/g/n | b/g/n | b/g/n | b/g/n | b/g/n |
| Spatial Streams | 2 | 2 | 2 | 1 | 1 | 2 |
| Support Rates | 1,2,5.5,11 | 1,2,5.5,11 | 1,2,5.5,11 | 1,2,5.5,11 | 1,2,5.5,11 | 1,2,5.5,11 |
| Extended Supported Rates | 6,9,12,18,24,36,48,54 | 6,9,12,18,24,36,48,54 | 6,9,12,18,24,36,48,54 | 6,9,12,18,24,36,48,54 | 6,9,12,18,24,36,48,54 | 6,9,12,18,24,36,48,54 |
| HT Capabilities | 0x002d | 0x002d | 0x0020 | 0x002d | 0x110c | 0x002d |
| A-MPDU | 0x17 | 0x17 | 0x1a | 0x17 | 0x19 | 0x17 |
| Extended Capabilities | 8 octets | | 4 octets | 8 octets | | 8 octets |
| Interworking | | | Wildcard | | | |
| VS Wi-Fi All-Hotspot 2.0 | | | | | | |
| VS Wi-Fi Display (13) | | | | | | |
| VS Wi-Fi P2P (9) | | | | | 0x110c | |
| VS Epigram HT Capabilities Info | | | 0x0020 | | 0x19 | |
| HT Capabilities | 0x002d | | 0x1a | | | |
| A-MPDU | 0x17 | | | | | |
| VS Epigram cara | 08df0c3258810ffaff0 000faff000 | 08df0c3258810ffaff0 000faff000 | | 08df0c3258810ffaff0 000faff000 | | 08df0c3258810ffaff0 000faff000 |
| VS Microsoft (8) cara | 001300/f | 001400b6 | 001100 | 001100 | | 001300/f |
| VS Microsoft WPS | | | | | 1 | |
| VS B... (2) | 020000100000 | 020000100000 | 020000000000 | 020000100000 | 020000040000 | 020000100000 |

| CUI | S | M | K | HT | M |
|---|---|---|---|---|---|
| Rest of MAC Address | 31 75 c9 | bb 1c 1c | 69 49 31 | 52 19 d9 | 82 c9 59 | 96 90 46 |
| Chipset | Broadcom | Broadcom | B... | B... | B... | B... |
| Modes | b/g/n | b/g/n | b/g/n | b/g/n | b/g/n | b/g/n |
| Spatial Streams | 1 | 1 | 1 | 1 | 1 | 0 |
| Support Rates | 1,2,5.5,11 | 1,2,5.5,11 | 1,2,5.5,11 | 1,2,5.5,11 | 1,2,5.5,11 | 1,2,5.5,11 |
| Extended Supported Rates | 6,9,12,18,24,36,48,54 | 6,9,12,18,24,36,48,54 | 6,9,12,18,24,36,48,54 | 6,9,12,18,24,36,48,54 | 6,9,12,18,24,36,48,54 | 6,9,12,18,24,36,48,54 |
| HT Capabilities | 0x1020 | 0x102d | 0x016e | 0x012c | 0x01be | |
| A-MPDU | 0x1a | 0x17 | 0x03 | 0x17 | 0x03 | |
| Extended Capabilities | | 8 octets | | 6 octets | | |
| Interworking | | | | Wildcard | | |
| VS Wi-Fi All-Hotspot 2.0 | | | | 1 | | |
| VS Wi-Fi Display (13) | | | | | | |
| VS Wi-Fi P2P (9) | | | | | | |
| VS Epigram HT Capabilities Info | | | | | | |
| HT Capabilities | 0x1020 | | | | | |
| A-MPDU | 0x1a | | | | | |
| VS Epigram (4) cara | | | | | | |
| VS Microsoft (8) cara | | | | | | |
| VS Wi-Fi Display WPS | | 08 | | 00000 | | 0 |
| VS B... (2) | 020000100000 | 020091000000 | 0 | | 1 | |

FIG. 10

| M | M | S | S | S |
|---|---|---|---|---|
| 73 1e 3e | d1 93 5a | 21 51 97 (unknown) | 01 ee fc | 4b c2 ed | 13 29 a2 |
| SSID | SSID | SSID | SSID | SSID | SSID |
| Support Rates | Support Rates | Support Rates | Support Rates | Support Rates | Support Rates |
| Extended Supported Rates | Extended Supported Rates | Extended Supported Rates | Extended Supported Rates | Extended Supported Rates | Extended Supported Rates |
| DS Parameter Set | DS Parameter Set | DS Parameter Set | DS Parameter Set | DS Parameter Set | |
| HT Capabilities | HT Capabilities | HT Capabilities | HT Capabilities | HT Capabilities | |
| Extended Capabilities | VS Epigram HT Capabilities | Extended Capabilities | Extended Capabilities | VS Epigram (4) | |
| VS Epigram (4) | VS Epigram (4) | Interworking | VS Wi-Fi ALL (HS2.0) | VSB... | VS Microsoft (8) |
| VS Microsoft (8) | VS Microsoft (8) | VSB... | VS Epigram HT Capabilities | | VSB... |
| VSB... | VSB... | VS Epigram HT Capabilities | VS Microsoft (8) | | |
| | | VS Microsoft (8) | VSB... | | |

| M | S | M | K | HT | HH |
|---|---|---|---|---|---|
| 79 da 4f | 31 75 99 | bb fc 1c | 69 49 3f | 52 19 d9 | 82 c9 59 |
| SSID | SSID | SSID | SSID | SSID | SSID |
| Support Rates | Support Rates | Support Rates | Support Rates | Support Rates | Support Rates |
| Extended Supported Rates | Extended Supported Rates | Extended Supported Rates | Extended Supported Rates | Extended Supported Rates | Extended Supported Rates |
| DS Parameter Set | DS Parameter Set | DS Parameter Set | DS Parameter Set | DS Parameter Set | |
| HT Capabilities | HT Capabilities | HT Capabilities | HT Capabilities | HT Capabilities | |
| Extended Capabilities | VSB... | Extended Capabilities | | VS Microsoft WPS | |
| VS Epigram (4) | VS Epigram HT Capabilities | VSB... | | VS Wi-Fi Display | |
| VS Microsoft (8) | | VS Epigram HT Capabilities | | VS Wi-Fi ALL P2P | |
| VSB... | | VS Epigram (4) | | VS Wi-Fi ALL HS2.0 | |
| | | VS Microsoft (8) | | | |

IDENTIFICATION OF MOBILE NODES IN WLAN COMMUNICATIONS

CROSS-REFERENCE TO RELATED APPLICATION

This application is related to and claims priority to U.S. Provisional Patent Application Ser. No. 62/302,488, filed Mar. 2, 2016, entitled "IDENTIFICATION OF NON-AP STATIONS IN WLAN COMMUNICATIONS," the entirety of which is incorporated herein by reference.

STATEMENT REGARDING FEDERALLY SPONSORED RESEARCH OR DEVELOPMENT

This invention was made with government support under contract MSA-PAT-2015003 awarded by United States Department of Defense. The government has certain rights in the invention.

TECHNICAL FIELD

Wireless local area network (WLAN) device communications and, in particular, to a method and system configured to identify unknown non-access point stations or mobile nodes.

BACKGROUND

Initially, it is noted that IEEE Standard 802.11-2012 (Standard) is used as a reference for specifications used in this disclosure, the entire contents of which are incorporated herein by reference.

FIG. 1 is a block schematic diagram of a typical IEEE 802.11 infrastructure network 100. A number of station (STA) nodes, 120a, 120b, 120c, 120d, 120e and 120f (collectively referred to as "mobile nodes 120") may or may not be associated with access point (AP) 110 which, in turn, is in communication with a hard-wired distribution system 130. As used herein, the term "mobile node" refers to a non-AP station. In such a network, unassociated mobile nodes 120 will periodically transmit a probe request in order to locate and identify the network. These probes may be directly addressed to the AP 110 or may be addressed to a broadcast address. Mobile nodes 120 that are associated with the AP 110 will also periodically transmit probe requests in order to determine if other APs 110 may be in the vicinity. The term mobile node used herein may refer to any type of wireless device communicating with an access point in a wireless communication system. Examples of mobile nodes include, but are not limited to user equipment (UE), target device, device to device (D2D) mobile node, machine type mobile node or mobile node capable of machine to machine (M2M) communication, PDA, tablet, smart phone, laptop computer, desktop computer, wireless appliance, laptop embedded equipped (LEE), laptop mounted equipment (LME), device with wireless transceiver, USB dongle, etc.

The Standard specifies the information and information elements (IEs) that may be included in the management frame of subtype probe requests. It should be noted that the Standard is regularly revised as new amendments are approved. As a result of approved amendments and revision of the Standard, the probe request frame body may have additional information than that listed in the Standard. It should also be noted that a specific probe request from a specific mobile node 120 may not include all the information listed in the Standard but may include a selection that is determined by each mobile node 120 as a result of its features, its default settings and then possibly added to or changed by user settings. The information provided in the probe request will, to a large extent, reflect the capabilities of that mobile node 120 as well as specific user settings.

There is no requirement to transmit the information provided in the probe request in a specific order. However, it is common practice that the probe request starts with the first three tagged parameters, Service Set Identifier (SSID), Supported Rates, and Direct Sequence (DS) Parameter Set which are sent in order, but the rest of the IEs are, in practice, sent in differing orders according to the individual mobile node 120.

One type of parameter that may be included in the probe request is the "Vendor Specific" IE. The element format includes an "Organization Identifier" which is the Organizationally Unique Identifier (OUI). The OUI is a 24-bit number that uniquely identifies a vendor, manufacturer or other organization. There are some common vendor specific IEs such as the ones for Wi-Fi Multimedia (WMM) and Wi-Fi Protected Setup (WPS) which are, respectively, the Wi-Fi Alliance IEs for quality of service settings and protected setup. In one embodiment, the present disclosure relates to vendor specific IEs that refer to the chipset and/or firmware vendor.

FIG. 2 shows the management frame format which is used for the probe request transmission. When a mobile node 120 transmits the probe request, the probe request is sent with a particular format. For example, "Address 2" represents the Media Access Control (MAC) address of the mobile node 120. Typically, the first three octets of the MAC address are the OUI. A mobile node 120, however, may choose to use a random MAC address so as to hide the identity of the mobile node 120.

FIG. 3 is an example of information obtained in a probe request capture, from a known mobile node 120, using an analyzer tool, for example, the WIRESHARK® analyzer tool. The information obtained from the captured probe request may include the following:

Transmitter Address. The first three octets of the address are the OUI.

Supported Rates: Provides the list of supported data rates. This particular set of rates indicates that the mobile node 120 supports 802.11b.

Extended Supported Rates: Provides additional list of supported data rates. This particular set of rates indicates that the mobile node 120 supports 802.11g.

High Throughput (HT) Capabilities: These indicate that the mobile node 120 supports 802.11n capability.

Extended Capabilities: This indicates that the mobile node 120 supports a large set of extended capabilities.

Vendor Specific Epigram

Vendor Specific MICROSOFT® WPS

Vendor Specific "B . . . ": This indicates the mobile node 120 chipset vendor OUI Furthermore, from FIG. 3, the order that the tagged parameters are sent is clearly seen as service set identifier (SSID), Supported Rates, Extended Supported Rates, distribution system (DS) Parameter Set, HT Capabilities, Extended Capabilities, Vendor Specific Epigram, Vendor Specific Microsoft, Vendor Specific B . . . . The order in which the information in a probe request is transmitted has been found to differ significantly between mobile nodes 120. Hence, the order or organization of the received information can be used as part of the fingerprint for this particular mobile node 120.

FIG. 4 is the same probe request as in FIG. 3 but the HT Capabilities details have been expanded. From the Supported Rates field and Extended Supported Rates field, the mobile node 120 has indicated that it supports 802.11b and 802.11g modes. In addition, the mobile node 120 indicates that it also supports 802.11n mode by including the HT Capabilities elements in its probe request. In this example, some details within these elements include:

HT Capabilities Info: a value of 0×002d

Aggregated MAC Protocol Data Unit (A-MPDU) Parameters: a value of 0×17

Receiver Modulation and Coding Scheme (RX MCS) Set: an examination of the bitmasks indicates that the mobile node 120 supports the reception of MCS 0 to 15. Hence, the mobile node 120 supports two spatial streams on receive. In addition, the Transmit (TX) and RX MCS Set bit is 0 indicating that this mobile node 120 also supports two spatial streams on transmit. The Multiple-Input Multiple-Output (MIMO) capability of an 802.11n device is termed (a)×(b):(c), where (a) is the maximum number of transmit antennas or TX chains, (b) is the maximum number of receive antennas or RX chains, and (c) is the maximum number of data spatial streams. Hence, by examining the HT Capabilities element, this mobile node 120 has MIMO capability 2×2:2.

The specific details and breakdown of each of these elements shown in FIGS. 3 and 4 and explanations of each of the values and their corresponding features is not necessary for understanding the disclosure. For the purposes of this disclosure, the presence of the IE, the corresponding values, and the order in which they are sent are considered. There may be times, however, when deeper inspection of the particular features can be useful. Examples of these instances are explained below.

SUMMARY

According to one aspect of the disclosure, a method in a node identification system for identifying at least one unknown mobile node in a communications network using details related to at least one known mobile node and organization of the details related to the at least one known mobile node is provided. The method includes capturing details related to the at least one unknown mobile node and identifying an organization of the captured details related to the at least one unknown mobile node, comparing the details related to the at least one known mobile node and the organization of the details related to the at least one known mobile node with the captured details related to the at least one unknown mobile node and the organization of the captured details related to the at least one unknown mobile node, and determining a type of the at least one unknown mobile node based on the comparing of the details related to the at least one known mobile node and the organization of the captured details related to the at least one known mobile node with the captured details related to the at least one unknown mobile node and the organization of the captured details related to the at least one unknown mobile node.

According to an embodiment of this aspect, at least one of the details related to the at least one known mobile node and the details related to the at least one unknown mobile node is captured by a network protocol analyzer. According to another embodiment, the method further includes obtaining known data about the at least one known mobile node, and creating a fingerprint database, the fingerprint database comprising the organized details related to the at least one known mobile node and the obtained known data about the at least one known mobile node.

According to another embodiment, comparing the details related to the at least one known mobile node and the organization of the captured details related to the at least one known mobile node with the captured details related to the at least one unknown mobile node and the organization of the captured details related to the at least one unknown mobile node includes comparing the details related to the at least one unknown mobile node and the organization of the captured details related to the at least one known mobile node with the organized details related to the at least one known mobile node and the obtained known data about the at least one known mobile node stored in the fingerprint database.

According to another embodiment, the details related to the at least one known mobile node includes at least one of an identity of a vendor of the at least one known mobile node, a model number of the at least one known mobile node, a chipset type of the at least one known mobile node, and a firmware version used in the at least one known mobile node. According to another embodiment, if the details related to the at least one known mobile node and the organization of the captured details related to the at least one known mobile node does not match the captured details related to the at least one unknown mobile node and the organization of the captured details related to the at least one unknown mobile node, the method further includes outputting a list of known mobile nodes having details closest to details of the at least one unknown mobile nodes. According to another embodiment, the method further includes storing the details related to the at least one unknown mobile node and the organization of the captured details related to the at least one unknown mobile node in an unknown mobile node database, comparing contents of the unknown mobile node database with future captured details related to other known mobile nodes, identifying those details related to the at least one unknown mobile node that match the future captured details related to the other known mobile nodes based on comparing the contents of the unknown mobile node database with the future captured details related to other known mobile nodes and the organization of the future captured details related to the other known mobile nodes, and updating the contents of the unknown mobile node database to include the identified details.

According to another embodiment, the details related to the at least one known mobile node are captured from a probe request transmitted by the at least one known mobile node and the details related to the at least one unknown mobile node are captured from another probe request transmitted by the at least one unknown mobile node. According to another embodiment, the method includes identifying those unknown mobile nodes from the at least one unknown mobile node having identical details, identifying, from those unknown mobile nodes having identical details, a set of unknown mobile nodes have different MAC addresses, determining, from the set of unknown mobile nodes having different MAC addresses, whether any unknown mobile nodes have random MAC addresses. If it is determined that unknown mobile nodes from the set of unknown mobile nodes having different MAC addresses have random MAC addresses, the method further includes tagging the unknown mobile nodes having random MAC addresses as a single unknown mobile node, and if it is determined that unknown mobile nodes from the set of unknown mobile nodes having different MAC addresses do not have random MAC addresses, the method further includes tagging the unknown mobile nodes having random MAC addresses as separate unknown mobile nodes.

According to another embodiment, if a match is found between the details related to the at least one known mobile node and the organization of the details related to the at least one known mobile node, and the captured details related to the at least one unknown mobile node and the organization of the captured details related to the at least one unknown mobile, the method further includes outputting information regarding the match to at least one of a display and a file.

According to another aspect of the disclosure, a node identification system configured to identify at least one unknown mobile node in a communications network using details related to at least one known mobile node and organization of the captured details includes a communications interface configured to capture details related to the at least one unknown mobile node and identifying an organization of the captured details related to the at least one unknown mobile node, and processing circuitry including a memory and a processor, the memory in communication with the processor, the memory having instructions that, when executed by the processor, configure the processor to compare the details related to the at least one known mobile node and the organization of the captured details related to the at least one known mobile node with the captured details related to the at least one unknown mobile node and the organization of the captured details related to the at least one unknown mobile node, and determine a type of the at least one unknown mobile node based on the comparing of the details related to the at least one known mobile node and the organization of the captured details related to the at least one known mobile node with the captured details related to the at least one unknown mobile node and the organization of the captured details related to the at least one unknown mobile node.

According to an embodiment of this aspect, at least one of the details related to the at least one known mobile node and the details related to the at least one unknown mobile node is captured by a network protocol analyzer. According to another embodiment, the processor is further configured to obtain known data about the at least one known mobile node, and create a fingerprint database, the fingerprint database comprising the organized details related to the at least one known mobile node and the obtained known data about the at least one known mobile node.

According to another embodiment, wherein comparing the details related to the at least one known mobile node and the organization of the captured details related to the at least one known mobile node with the captured details related to the at least one unknown mobile node and the organization of the captured details related to the at least one unknown mobile node includes comparing the details related to the at least one unknown mobile node and the organization of the captured details related to the at least one known mobile node with the organized details related to the at least one known mobile node and the obtained known data about the at least one known mobile node stored in the fingerprint database. According to another embodiment, the details related to the at least one known mobile node includes at least one of an identity of a vendor of the at least one known mobile node, a model number of the at least one known mobile node, a chipset type of the at least one known mobile node, and a firmware version used in the at least one known mobile node.

According to another embodiment, if the details related to the at least one known mobile node and the organization of the captured details related to the at least one known mobile node does not match the captured details related to the at least one unknown mobile node and the organization of the captured details related to the at least one unknown mobile node, further comprising outputting a list of known mobile nodes having details closest to details of the at least one unknown access points. According to another embodiment, the processor is further configured to store the details related to the at least one unknown mobile node and the organization of the details related to the at least one unknown mobile node in an unknown mobile node database, compare contents of the unknown mobile node database with future captured details related to other known mobile nodes and organization of the future captured details related to the other known mobile nodes, identify those details related to the at least one unknown mobile node that match the future captured details related to the other known mobile nodes based on comparing the contents of the unknown mobile node database with the future captured details related to other known mobile nodes and the organization of the future captured details related to the other known mobile nodes, and update the contents of the unknown mobile node database to include the identified details.

According to another embodiment, the processor is further configured to identify those unknown mobile nodes from the at least one unknown mobile node having identical details, identify, from those unknown mobile nodes having identical details, a set of unknown mobile nodes have different MAC addresses, and determine, from the set of unknown mobile nodes having different MAC addresses, whether any unknown mobile nodes have random MAC addresses. If it is determined that unknown mobile nodes from the set of unknown mobile nodes having different MAC addresses have random MAC addresses, the processor is configured to tag the unknown mobile nodes having random MAC addresses as a single unknown mobile node, and if it is determined that unknown mobile nodes from the set of unknown mobile nodes having different MAC addresses do not have random MAC addresses, the processor is further configured to tag the unknown mobile nodes having random MAC addresses as separate unknown mobile nodes.

According to another embodiment, if a match is found between the details related to the at least one known mobile node and the organization of the details related to the at least one known mobile node, and the captured details related to the at least one unknown mobile node and the organization of the captured details related to the at least one unknown mobile, the processor is further configured to output information regarding the match to at least one of a display and a file.

According to another aspect of the disclosure, a method in a node identification system for identifying at least one unknown mobile node in a communications network using details related to at least one known mobile node and organization of the details related to the at least one known mobile node, the details related to the at least one known mobile node including at least one of an identity of a vendor of the at least one known mobile node, a model number of the at least one known mobile node, a chipset type of the at least one known mobile node, and a firmware version used in the at least one known mobile node, is provided. The method includes receiving a probe request from at least one unknown mobile node, capturing details from the received probe request related to the at least one unknown mobile node and identifying an organization of the captured details related to the at least one unknown mobile node, comparing the details related to the at least one known mobile node and the organization of the details related to the at least one known mobile node with the captured details related to the at least one unknown mobile node and the organization of the captured details related to the at least one unknown mobile node, and determining a type of the at least one unknown mobile node based on the comparing of the details related to the at least one known mobile node and the organization of the details related to the at least one known mobile node with the captured details related to the at least one unknown mobile node and the organization of the captured details related to the at least one unknown mobile node.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

A more complete understanding of the present invention, and the attendant advantages and features thereof, will be more readily understood by reference to the following detailed description when considered in conjunction with the accompanying drawings wherein:

FIG. 3 is an example of data from a probe request capture, from a known mobile node;

FIG. 4 is the same probe request as in FIG. 3, but expanded HT Capabilities and HT Information details have been expanded;

FIG. 9 is a table of probe request details that were detected using a using a network protocol analyzer;

FIG. 10 is a table illustrating the organization in which the information was transmitted in the probe request for each of the mobile nodes in FIG. 9.

DETAILED DESCRIPTION

Figure 1:
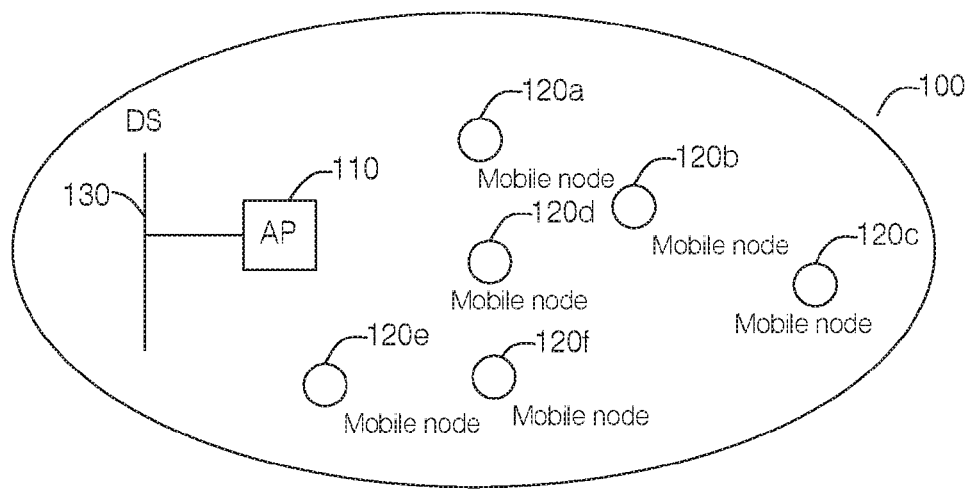
FIG. 1 is an exemplary schematic diagram of a typical IEEE 802.11 infrastructure network comprising an AP and mobile nodes that may or may not be associated to the AP.
Figure 2:
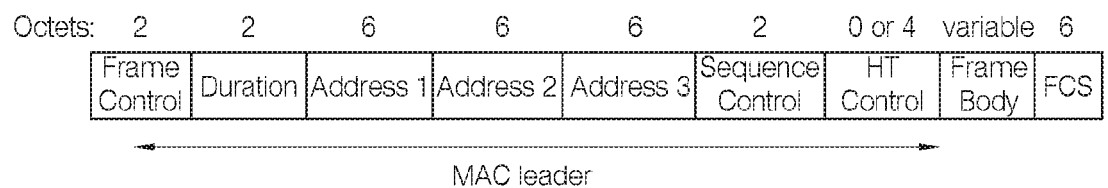
FIG. 2 is an exemplary IEEE 802.11 Management frame format.

This disclosure relates to the identification of mobile nodes that are based upon the IEEE 802.11 technology, commonly known as Wi-Fi. This disclosure also relates to the identification of, for example, an unknown mobile node vendor, the mobile node model, the chipset vendor and the chipset type, and also, in some cases, of the specific firmware version that is in use on that chipset/mobile node. This disclosure also relates to the details of probe request transmissions.

This disclosure further relates to the "fingerprinting" of Wi-Fi mobile nodes 120 by inspection, recording, classification and comparison of their probe request transmissions. By the inspection of a probe request transmission plus the noting of the order that the information in the request is transmitted, a unique "fingerprint" for that mobile node 120, such as type/model/chipset/version, can be determined. The details and order (i.e., organization) of the probe response elements, together with the OUI of the MAC address can be unique and vary significantly between different mobile nodes 120. Thus, by collecting and storing information, such as the probe request information, together with the specific details of known mobile nodes 120, such as e.g., vendor, model, chipset vendor, chipset type, firmware, etc., a database of "fingerprints" for various types of mobile nodes 120 can be created. By comparison of fingerprints from unknown mobile nodes 120 with known mobile nodes 120, information such as type/model/chipset/version of the unknown mobile node 120 can be determined.

In one embodiment, when probe requests from an unknown mobile node 120 are detected and decoded, certain information can be readily extracted. This information may include:

Mobile Node Vendor—from the OUI of the transmitter address

Modes, a/b/g/n/ac—from the supported data rates, HT and very high throughput (VHT) Capabilities elements Multiple input/output (MIMO) Spatial Streams Capability—from the supported MCS fields Chipset vendor—from the vendor specific element Then, by comparison with the database, selecting and comparing data on similar chipset or mobile node vendor records, it is possible to further identify the mobile node model and the chipset type. If a match is not found, then the "fingerprint" of the unknown mobile node 120 could still be saved so that at a later time, a new known mobile node 120 may be found that has the same fingerprint. In many cases, even if an exact match is not found, it is still possible to narrow down the chipset type and/or mobile node model to a particular family and similarly the mobile node model by comparing to close matches with the fingerprints of known mobile nodes 120 and known chipsets.

Wi-Fi IEEE 802.11 transmissions can be readily captured using a network protocol analyzer tool, such as the "WIRESHARK®" packet analyzer used for network troubleshooting and analysis, although any similar tool may be used. Such a tool can be used, together with an 802.11 receiver, to capture and view the management, control and data frames from the wireless traffic. In particular, the probe request transmissions can be captured and the details displayed and stored. This process is often referred to as "sniffing."

Figure 5:
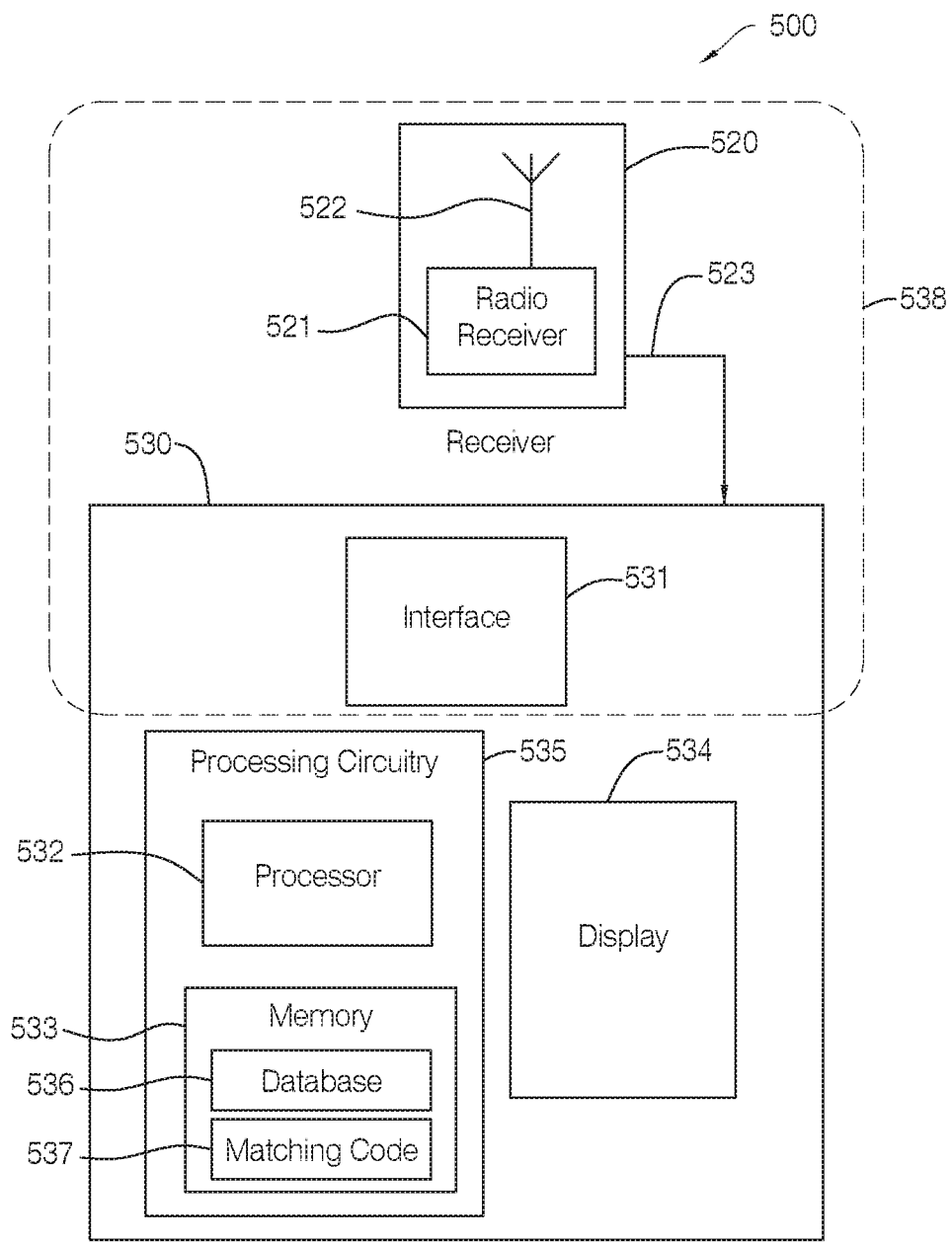
FIG. 5 is an example system constructed in accordance with the principles of the present disclosure.

FIG. 5 is an example of a node identification system 500 constructed in accordance with the principles of the present disclosure. Node identification system 500 may be, for example a stationary node, or a portable node. As shown in the block diagram of FIG. 5, node identification system 500 includes a wireless receiver 520. The wireless receiver 520 has an antenna 522 and a radio receiver 521. Although not shown, it is understood that the wireless receiver 520 also includes a processor and memory to carry out the functions described herein with respect to the wireless receiver 520.

The signals radiated from mobile nodes 120 are picked up at antenna 522 and applied to the radio receiver 521 where they are detected and may be demodulated. In particular, receiver 520 receives and demodulates the probe request transmissions of mobile nodes 120. The demodulated signals are outputted from the radio receiver 521 and received by the computer system 530 via connection 523. Connection 523 may be, for example, an Ethernet, a Universal Serial Bus (USB), or serial connection. The computer system 530 has an interface 531 for receiving signals from wireless receiver 520, processing circuitry 535, which includes a processor 532, a memory 533, and a display 534. Memory also stores matching code 537, which, along with processor 532, and as explained in further detail below, determines if the information related to the known mobile nodes 120 matches the information related to the unknown mobile nodes 120. Receiver 520 and interface 531 of computer system 530 are referred to collectively as "communications interface 538."

In one embodiment, memory 533 stores programmatic instructions that when executed by processor 532, cause computer system 530 to perform the functions described herein. In addition to a traditional processor and memory, processing circuitry 535 may include integrated circuitry for processing and/or control, e.g., one or more processors and/or processor cores and/or FPGAs (Field Programmable Gate Array) and/or ASICs (Application Specific Integrated Circuitry). Processing circuitry 535 may include and/or be connected to and/or be configured for accessing (e.g., writing to and/or reading from) memory 533, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 533 may be configured to store code executable by control circuitry and/or other data, e.g., data pertaining to communication, e.g., configuration and/or address data of nodes, etc. Memory 533 includes database 536. As explained in further detail below, database 536, as managed by processor 532, is configured to store the probe request data that has been previously obtained from known mobile nodes 120 as well as unknown mobile nodes 120 as described herein to create a set of mobile node "fingerprints." The receiver system 520 and the computer system 530 may be separate devices or may be incorporated into one physical device.

In one embodiment, radio receiver 521 is used as a network protocol analyzer to detect, receive and demodulate Wi-Fi transmissions as described in further detail below. The demodulated signals are passed to the computer system 530 where the probe request signals are selected.

Figure 6:
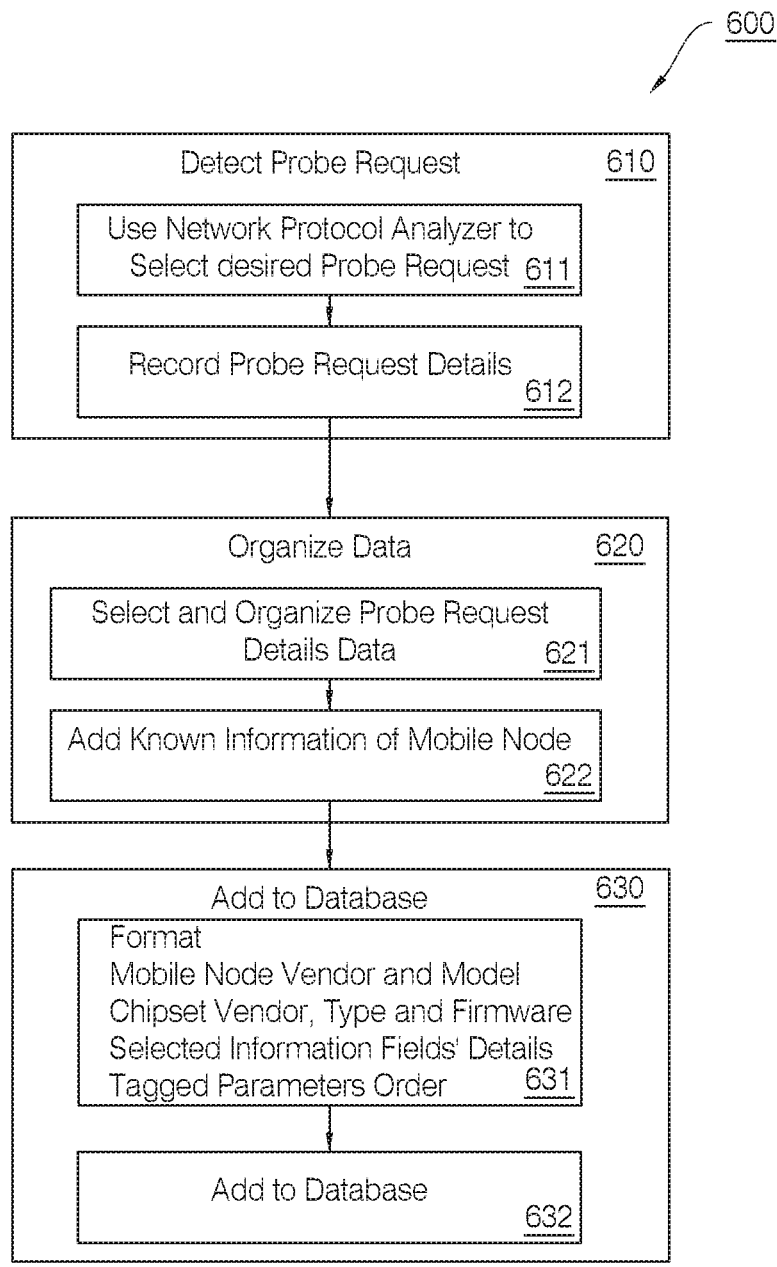
FIG. 6 illustrates a method for the detection and recording of probe requests followed by organization and addition to a database, according to an exemplary embodiment of the disclosure where the mobile node is known.

FIG. 6 illustrates method 600 according to an example embodiment of the disclosure where the mobile node 120 is known. Method 600 may start with stage 610 with the detection of the probe request of a known mobile node 120, i.e., a mobile node 120 which is in the possession of the person or persons creating database 536. The detection of the probe request may be performed by receiver 520. In one embodiment, stage 610 may include stage 611 where the probe request transmission(s) of the mobile node 120 under test is selected using a network protocol analyzer. This analyzer may be a readily available analyzer such as the open-source WIRESHARK® analyzer, or a proprietary analyzer. Such "sniffers" are well known in the field of WLANs. The present disclosure is not limited to an embodiment where the details about the mobile node 120 are obtained from a probe request. The present disclosure contemplates and may be used for embodiments where the details about the known and unknown mobile nodes 120 may be obtained in other manners. Stage 611 may be followed by stage 612 where the decoded probe request transmission is recorded. The method of recording or saving the received information details may vary. In one embodiment, the information is saved in the protocol analyzer "pcap" file possibly after filtering, or the detected details are parsed and saved to a file. Stage 610 may be followed by stage 620 where the recorded or stored data from the probe request transmission is organized into a desired form. Stage 620 may include stage 621 where a selected portion of the stored probe request data is selected and placed in a particular order or organization which forms the "fingerprint" for that mobile node 120. Some details of the probe request transmission tend to be default and fixed, related to the mobile node 120 and its features, and other parts may be configurable by the mobile node user. The default fixed parameters are of particular use for the process of gathering a fingerprint for vendor and chipset identification. However, it is still worthwhile selecting and storing some of the other information. Mobile node 120 can be configured by a user either over the air or by direct connection. The parameters that can be configured by the user though vary considerably.

Stage 621 may be followed by stage 622 where the known information of the mobile node 120 are added to the details gathered in stage 621. Stages 620, 621, and 622 may be performed by processing circuitry 535. Method 600 is concerned with forming a database 536 of mobile nodes 120 and hence the mobile nodes 120 used in this method are in the possession of the person or persons constructing the database 536. Details of the mobile node 120 such as vendor, model number, and chipset type and firmware version can be gathered in several ways. For example, the vendor and model number may be printed on a label attached to the mobile node 120. The chipset may be determined in several ways, including but not restricted to, visual inspection, using Internet sites such as www.wikidevi.com, which contains details of many mobile nodes 120 and/or connecting to the mobile node 120, via either a wired or wireless connection, and reading the information provided in the web based management utility of the mobile node 120. The web based management utility will usually also provide the firmware version and/or the ability to load new firmware in to the mobile node 120 and know which firmware is present.

Stage 620 may be followed by stage 630 where the gathered and organized data is added to database 536. Stage 630 may include stage 631 where the known mobile node 120 data from stage 622, together with the selected mobile node 120 probe request data from stage 621 are organized into a format compatible with database 536. Also, the order or organization that the tagged parameters are transmitted is also included. Stage 631 may be followed by stage 632 where the aforementioned data, formatted in stage 631, is entered in database 536. Stages 630, 631 and 632 may be performed by processing circuitry 535.

Method 600 may be repeated for every mobile node 120 of interest and in the possession of the person or persons constructing database 536 and may be repeated at regular intervals as new mobile nodes 120 are discovered. In such manner, a database 536 of mobile node fingerprints is created, maintained, and updated.

Figure 7:
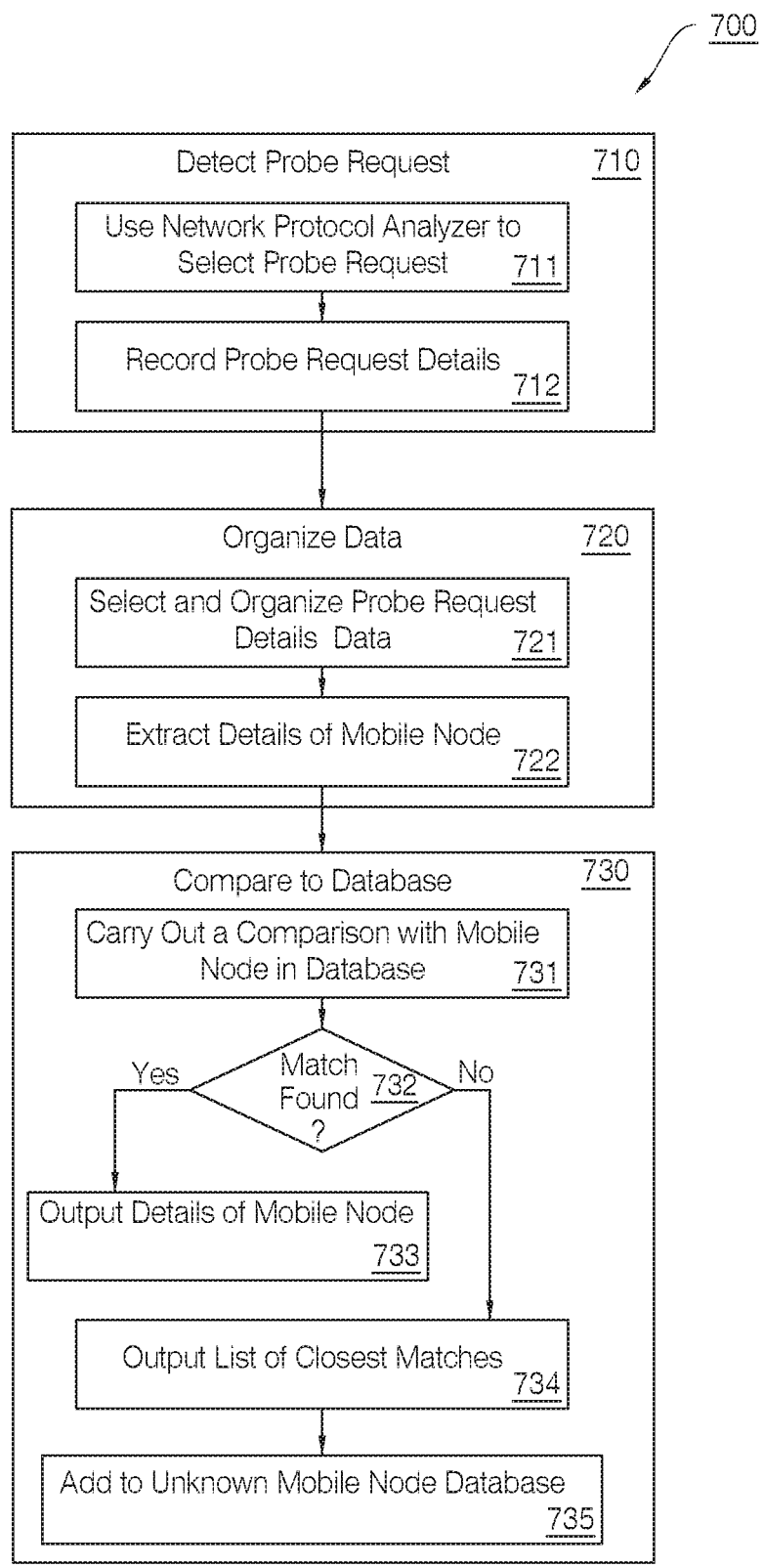
FIG. 7 illustrates a method for the detection and organization of probe requests which are subsequently compared to a database, according to an exemplary embodiment of the disclosure where the mobile node is not known.

FIG. 7 illustrates method 700 according to an exemplary embodiment of the disclosure where the mobile node 120 is not known. An unknown mobile node 120 is one that is not in the immediate possession of the person or persons conducting the search. Method 700 may include stage 710 with the detection of the probe request transmission(s) of an unknown mobile node 120. The detection of the probe request may be performed by receiver 520. Stage 710 has a similar function to stage 610 of FIG. 6. Stage 710 may include stage 711 where the probe request transmission(s) of the mobile node 120 is selected using a network protocol analyzer. Stage 711 has a similar function to stage 611 of FIG. 6. The detection of the probe request may be performed by receiver 520. Stage 710 may include stage 712 where the decoded probe request transmission is recorded. Stage 710 may be followed by stage 720 where the recorded or stored data from the probe request transmission is organized into a desired form. Stage 720 may start by stage 721 where a selection of the stored probe request data is selected and placed in a particular sequence. Stage 721 has a similar function to stage 621 of FIG. 6. Stage 721 may be followed by stage 722 where particular details of the mobile node 120 are extracted from the data. This may include the mobile node vendor and/or the chipset vendor. In addition, the Service Set Identifier (SSID) may be extracted. The mobile node vendor, chipset vendor and SSID may be used to act as a reference to this particular, unknown mobile node 120. Stages 720, 721 and 722 may be performed by processing circuitry 535.

Stage 720 may be followed by stage 730 where the recorded data from stage 712 is compared to the mobile node information stored in database 536 that was created using method 600. Stage 730 may include stage 731 where the details of the captured probe request data that has been organized in stage 720 is compared to the database of probe requests of known mobile nodes 120 and chipsets that has been organized and prepared in method 600 and stage 632. Stage 731 may be followed by stage 732 where a check is made as to whether a match has been found. If an exact match has been found, then stage 731 may be followed by stage 733 where the details or information regarding the match are is outputted. The output may take the form of a display or an entry into a file. If an exact match is not found in stage 732, then stage 732 may be followed by stage 734 where a list of the closest matches is outputted. This output may be in a particular order of likelihood. For example, it may be that there is just one minor difference in the comparisons which may be in a field that could be configured by a user. In such a case, the output may indicate a strong likelihood of a match. Furthermore, in such a case, there is a chance that the chipset type may be identified. It should be clear to one of skill in the art that there are many combinations of matches that could be used to create a degree of likelihood of a match. This disclosure is based upon the recognition that probe request details are unique and can be used to fingerprint a particular mobile node model and chipset. Stage 734 may be followed by stage 735 where the details of the unknown mobile node 120 are entered into an unknown access point database. This maybe a separate database or a subset of the same database 536 as created in method 600. The intention may be to create a database of unknown mobile nodes 120 that have been detected and recorded so as to determine if an exact match is found later, either by the use of a known mobile node 120 or an unknown mobile node 120. It is also useful that a particular mobile node 120 may be detected later at another time and possibly in a different place. The fingerprint may be used to determine that this is a particular mobile node 120 rather than a mobile node 120 of a particular vendor type and chipset.

For example, if a mobile node 120 is randomizing its MAC address, then a set of mobile nodes 120 may be recorded that are identical to each other, with the exception of the MAC addresses. In this case, by observation of other criteria, which may include but not be limited to factors such as vicinity, signal strength, time, periodicity and sequence numbers, the mobile node fingerprint will enable an observer to deduce that this is a single mobile node 120 that is using the random MAC address rather than a number of different mobile nodes 120. Stages 730, 731, 732, 733, 734 and 735 may be performed by processing circuitry 535.

Figure 8A:
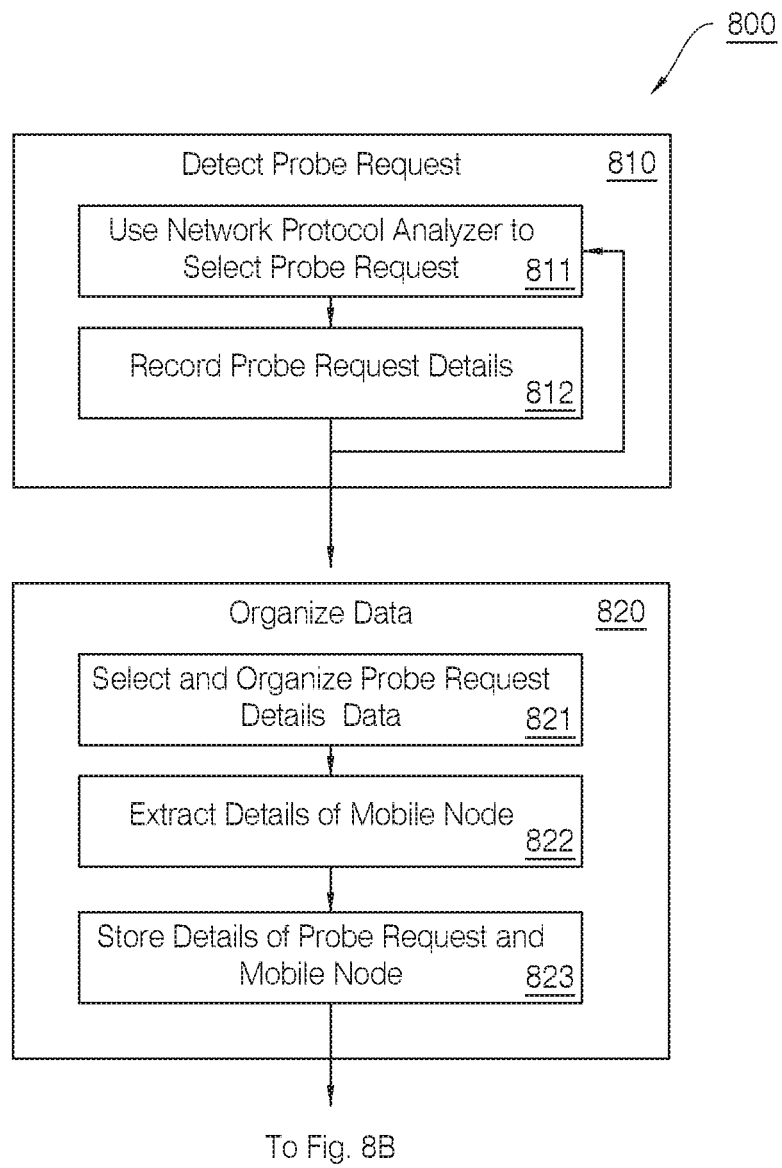
FIG. 8A illustrates a method for the detection and organization of probe requests which are then compared to other probe requests in order to determine if a mobile node is using randomized MAC addresses, according to an exemplary embodiment of the disclosure.

FIG. 8A illustrates method 800 for the detection and organization of probe requests which are then compared to other probe requests in order to determine if a mobile node 120 is using randomized MAC addresses, according to an exemplary embodiment of the disclosure. Method 800 may start by stage 810 with the detection of the probe request of an unknown mobile node 120. Stage 810 has a similar function to stages 610 and 710. Stage 810 may include stage 811 where the probe request transmission(s) of the mobile node 120 is selected using a network protocol analyzer. Stage 811 has a similar function to stages 611 and 711. Stage 811 may be followed by stage 812 where the decoded probe request transmission is recorded. Stage 812 is similar to stages 612 and 712. Method 800 may include and stage 810 may be followed by stage 820 where the recorded or stored data from the probe request transmission is organized into a desired form. Stage 820 may start by stage 821 where a selection of the stored probe request data and order is selected and placed in a particular order. Stage 821 has a similar function to stages 621 and 721. Stage 821 may be followed by stage 822 where particular details of the mobile node 120 are extracted from the data. This may include the mobile node vendor and the chipset vendor. Stage 822 has a similar function to stages 622 and 722. Stage 822 may be followed by stage 823 where the details of the probe request and order and any other identifying data for that mobile node 120 are stored. The database for storing this data may be similar to that used in stage 631, i.e., this data may be stored in database 536. Stages 821, 822 and 823 may be performed by processing circuitry 535.

Figure 8B:
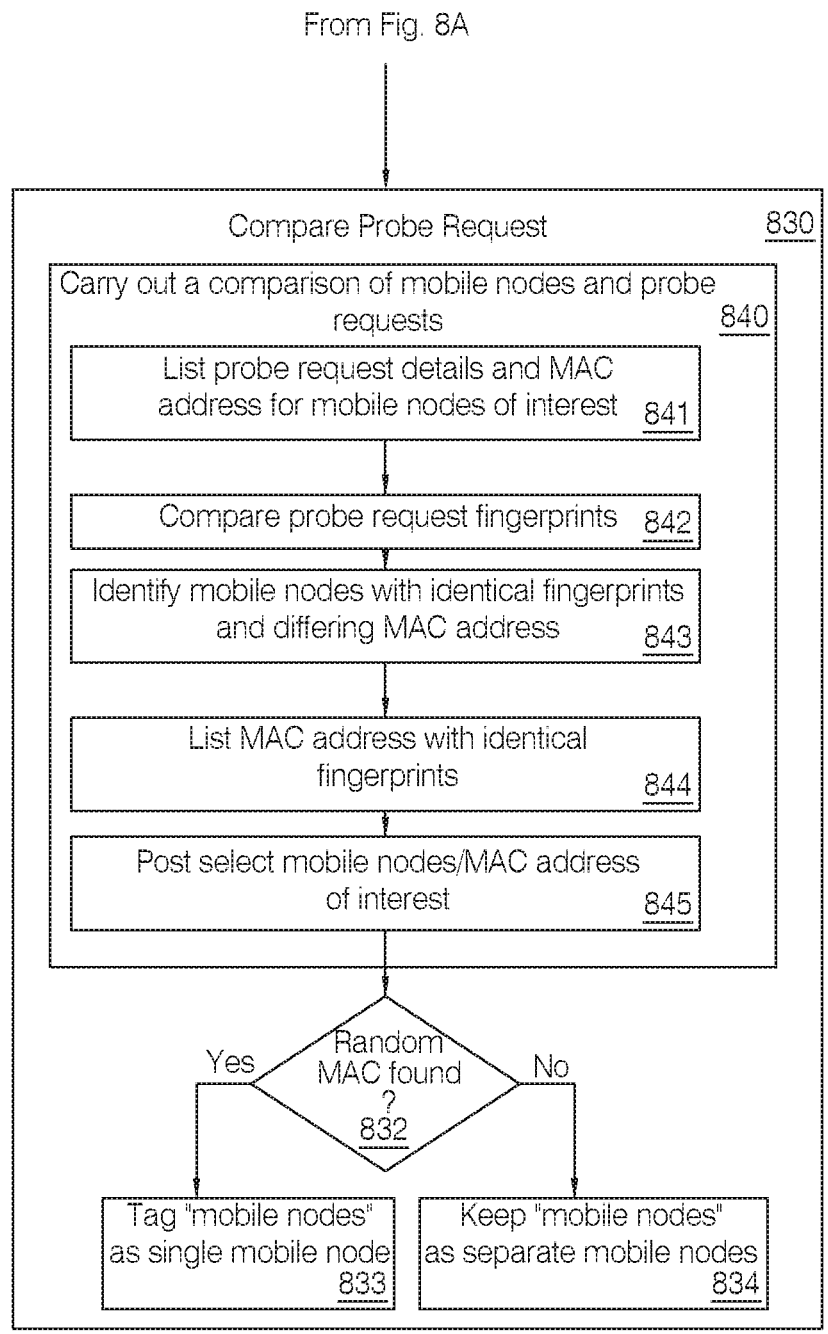
FIG. 8B is a continuation of FIG. 8*a* according to an exemplary embodiment of the disclosure.

FIG. 8B is a continuation of FIG. 8B and illustrates a continuation of method 800 according to an exemplary embodiment of the disclosure. Method 800 may include stage 830 where the probe request details and order, recorded in stage 823 are compared in order to determine if this mobile node 120 is using a random MAC address. Stage 830 may start by stage 840 where a comparison of mobile nodes 120 and probe requests is carried out. Stage 840 may start with stage 841 where the probe request details and the corresponding MAC addresses are selected and listed. Stage 841 may only list those mobile nodes 120 that fit a certain profile that indicates possible random MAC address operation, or may contain all mobile nodes 120 in a particular vicinity, or mobile nodes 120 detected within a certain timescale. The selection process details of which mobile nodes 120 to include in this list does not form part of this disclosure. Stage 841 may be followed by stage 842 where the probe request details and their order are arranged into the form of the fingerprint similar to that used for stages 823, 721 and 621, but other information such as, for example, signal strength, time(s) of arrival, location may also be added so as to form an extended fingerprint. Stage 842 may be followed by stage 843 where the extended fingerprints arranged in stage 842 are compared and those mobile nodes 120 with identical fingerprints but differing MAC addresses are identified and selected. Stage 843 may be followed by stage 844 where those MAC addresses having identical fingerprints are listed. Stage 844 may be followed by stage 845 where the mobile nodes 120 with identical fingerprints but differing MAC addresses outputted from stage 844 are then analyzed so as to select mobile nodes 120 that indicate a possible use of random MAC addressing. For this analysis, the extended fingerprint as produced in stage 843 may be used. The particular method details for this analysis and selection process does not form part of this disclosure.

Stage 830 may include stage 832 where the results from stage 845 may be further examined in order to make a decision as to which mobile nodes 120, if any, are using random MAC addresses. The particular method details for this examination and selection process does not form part of this disclosure. Stage 832 may be followed by stage 833, which tags those mobile nodes 120 that have been identified in stage 832 as mobile nodes 120 using random MAC addresses, and stage 834 which identifies those mobile nodes 120 that have identical fingerprints but which are indeed different, unique devices. Stages 840 through 845 may be performed by processing circuitry 535.

FIG. 9 is a table of probe request details that were detected using a using a network protocol analyzer. The left-most column is a list of the information present in this set of detected probe requests. The other columns show the actual information for each of the probe responses that were detected for each mobile node 120. The information is very similar for the different mobile nodes 120 but only two sets are identical, "K 69 49 3f" and "M 96 90 46" and in this case these are two different vendors. It can be readily seen that of this set, six mobile nodes 120 have the same OUI, "S . . . ", and nine mobile nodes have chipsets with the same specific vendor IE, "B . . . ". However, although some of the mobile nodes 120 have probe request details that are similar, no two have identical probe request details.

FIG. 10 is a table illustrating the order in which the information was transmitted in the probe request for each of the mobile nodes 120 in FIG. 9. Several mobile nodes 120 do have identical orders, for example, the orders for the mobile nodes 120 identified in the table as "M 73 1e 3e", "M d1 93 5a", "S 79 da 4f" are the same, as are "S 4b c2 ed" and "S 31 75 99."

Again, as previously observed, it should be noted, that together, the details as shown in FIG. 9 and FIG. 10 display a unique mobile node 120 and/or chipset fingerprint.

The unique fingerprint that is created using the probe request transmission can also indicate differences between firmware versions of the same mobile node models and chipsets. When possible, as well as recording the mobile node model and chipset type, the hardware and firmware versions should also be recorded as part of the known fingerprint as carried out in stages 622 and 631. These fingerprints may be used in several ways, including but not limited to the identification of a unique mobile node 120 and the identification of a mobile node 120 that may be using random MAC addresses. The fingerprint may be combined with other information including, but not limited to, location, time, signal strength, and usage.

Figure 11:
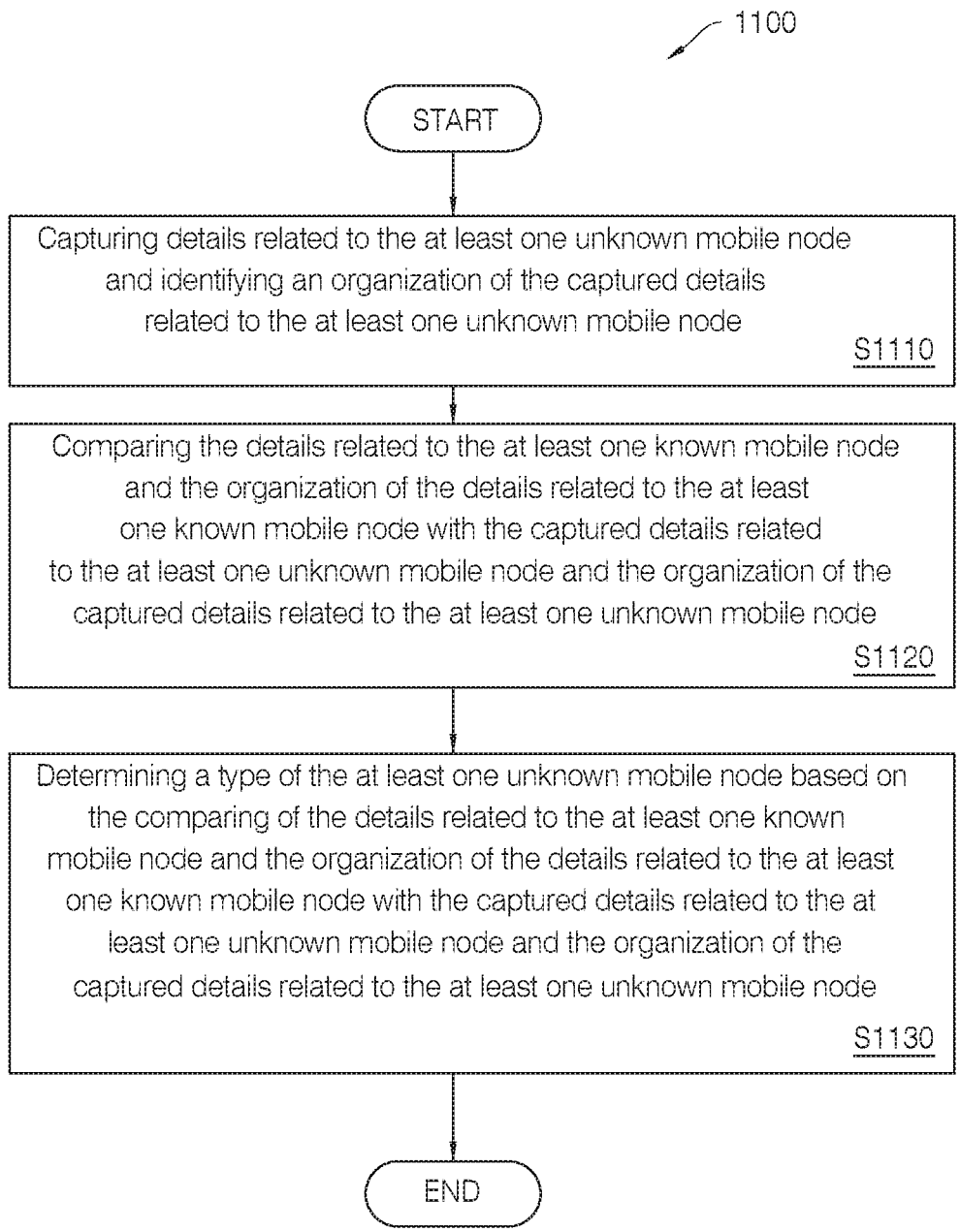
FIG. 11 illustrates a flow diagram according to an embodiment of the disclosure.

FIG. 11 is a flow diagram illustrating method 1100 in, for example, a node identification system 500, for identifying at least one unknown mobile node 120 in a communications network using details related to at least one known mobile node 120 and organization of the details related to the at least one known mobile node 120. The steps of FIG. 11 may be performed, for example, by processor 532 in conjunction with matching code 537. In this embodiment, method 1100 includes capturing details related to the at least one unknown mobile node and identifying an organization of the captured details related to the at least one unknown mobile node (Block S1110), comparing the details related to the at least one known mobile node 120 and the organization of the details related to the at least one known mobile node 120 with the captured details related to the at least one unknown mobile node 120 and the organization of the captured details related to the at least one unknown mobile node (Block S1120), and determining a type of the at least one unknown mobile node 120 based on the comparing of the details related to the at least one known mobile node 120 and the organization of the details related to the at least one known mobile node 120 with the captured details related to the at least one unknown mobile node 120 and the organization of the captured details related to the at least one unknown mobile node 120 (Block 1230). According to another embodiment, at least one of the details related to the at least one known mobile node 120 and the details related to the at least one unknown mobile node 120 is captured by a network protocol analyzer.

According to another embodiment, method 1100 further includes obtaining, by communications interface 531, known data about the at least one known mobile node 120, and creating, by processor 532, a fingerprint database, the fingerprint database comprising the organized details related to the at least one known mobile node 120 and the obtained known data about the at least one known mobile node 120. The fingerprint database could be, for example, database 536 shown in FIG. 5.

According to another embodiment, comparing the details related to the at least one known mobile node 120 and the organization of the details related to the at least one known mobile node 120 with the captured details related to the at least one unknown mobile node 120 and the organization of the captured details related to the at least one unknown mobile node 120 includes comparing the details related to the at least one unknown mobile node 120 and the organization of the details related to the at least one known mobile node 120 with the organized details related to the at least one known mobile node 120 and the obtained known data about the at least one known mobile node 120 stored in the fingerprint database 536.

According to another embodiment, the details related to the at least one known mobile node 120 includes at least one of an identity of a vendor of the at least one known mobile node 120, a model number of the at least one known mobile node 120, a chipset type of the at least one known mobile node 120, and a firmware version used in the at least one known mobile node 120.

According to another embodiment, if the details related to the at least one known mobile node 120 and the organization of the details related to the at least one known mobile node 120 does not match the captured details related to the at least one unknown mobile node 120 and the organization of the captured details related to the at least one unknown mobile node 120, the method further includes further comprising outputting a list of known mobile nodes 120 having details closest to details of the at least one unknown mobile nodes 120.

According to another embodiment, the method 1300 further includes storing the details related to the at least one unknown mobile node 120 and the organization of the details related to the at least one unknown mobile node 120 in an unknown access point database, comparing contents of the unknown access point database with future captured details related to other known mobile nodes 120 and organization of the future captured details related to the other known mobile nodes 120, identifying those details related to the at least one unknown mobile node 120 that match the future captured details related to the other known mobile nodes 120 based on comparing the contents of the unknown access point database with the future captured details related to other known mobile nodes 120 and the organization of the future captured details related to the other known mobile nodes 120, and updating the contents of the unknown access point database to include the identified details.

According to another embodiment, the details related to the at least one known mobile node 120 are captured from a probe request transmitted by the at least one known mobile node 120 and the details related to the at least one unknown mobile node 120 are captured from another probe request transmitted by the at least one unknown mobile node 120. In one embodiment, the details are captured by a network protocol analyzer.

According to another embodiment, the method further includes identifying those unknown mobile nodes 120 from the at least one unknown mobile node 120 having identical details, identifying, from those unknown mobile nodes 120 having identical details, a set of unknown mobile nodes 120 have different MAC addresses, determining, from the set of unknown mobile nodes 120 having different MAC addresses, whether any unknown mobile nodes 120 have random MAC addresses. If it is determined that unknown mobile nodes 120 from the set of unknown mobile nodes 120 having different MAC addresses have random MAC addresses, the method further includes tagging the unknown mobile nodes 120 having random MAC addresses as a single unknown mobile node 120, and if it is determined that unknown mobile nodes 120 from the set of unknown mobile nodes 120 having different MAC addresses do not have random MAC addresses, the method further includes tagging the unknown mobile nodes 120 having random MAC addresses as separate unknown mobile nodes 120.

According to another embodiment, if a match is found between the details related to the at least one known mobile node 120 and the organization of the details related to the at least one known mobile node 120, and the captured details related to the at least one unknown mobile node 120 and the organization of the captured details related to the at least one unknown mobile node, the method further includes outputting information regarding the match to at least one of a display and a file.

Figure 12:
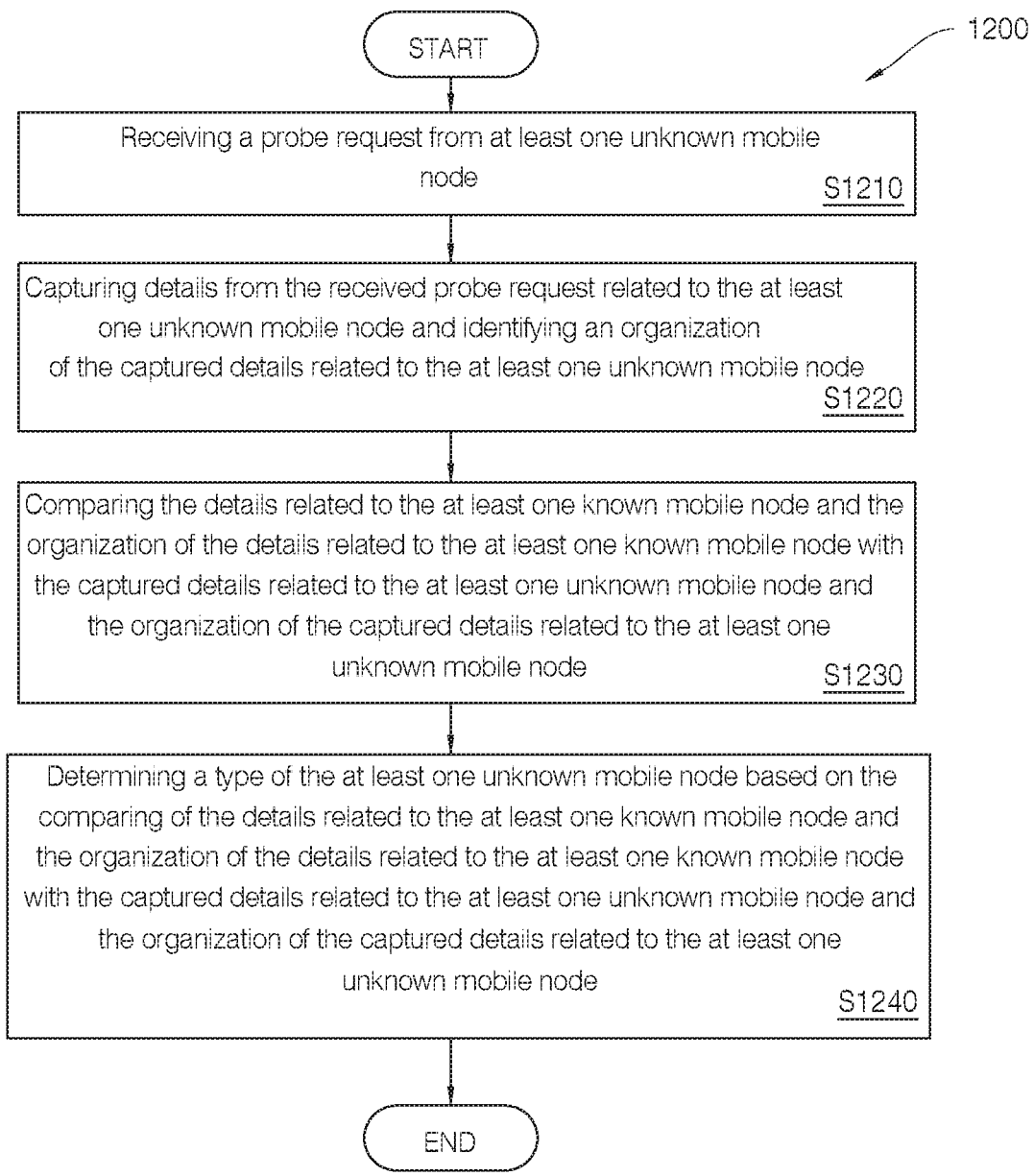
FIG. 12 illustrates a flow diagram according to an alternate embodiment of the present disclosure.

FIG. 12 is a flow diagram illustrating a method 1200 in, for example, in node identification system 500 for identifying at least one unknown mobile node 120 in a communications network using details related to at least one known mobile node 120 and organization of the details related to the at least one known mobile node 120, the details related to the at least one known mobile node 120 including at least one of an identity of a vendor of the at least one known mobile node 120, a model number of the at least one known mobile node 120, a chipset type of the at least one known mobile node 120, and a firmware version used in the at least one known mobile node 120. The method 1200 includes receiving a probe request from at least one unknown mobile node 120 (Block S1210), capturing details from the received probe request related to the at least one unknown mobile node 120 and identifying an organization of the captured details related to the at least one unknown mobile node 120 (Block S1220), comparing the details related to the at least one known mobile node 120 and the organization of the details related to the at least one known mobile node 120 with the captured details related to the at least one unknown mobile node 120 and the organization of the captured details related to the at least one unknown mobile node 120 (Block S1230), and determining a type of the at least one unknown mobile node 120 based on the comparing of the details related to the at least one known mobile node 120 and the organization of the details related to the at least one known mobile node 120 with the captured details related to the at least one unknown mobile node 120 and the organization of the captured details related to the at least one unknown mobile node 120 (Block S1240).

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of the beacon and/or the probe request, various details within the information elements in the beacon and/or probe request, the format and details of the database and the database query mechanism, the number of databases and their relationships to each other, the output and display of the results of the database query. Accordingly, the scope should be determined not by the embodiments illustrated, but by the claims and their legal equivalents.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method in a node identification system for identifying at least one unknown mobile node in a communications network using details related to at least one known mobile node and organization of the details related to the at least one known mobile node, the method comprising:
    capturing details related to the at least one unknown mobile node and identifying an organization of the captured details related to the at least one unknown mobile node;
    comparing the details related to the at least one known mobile node and the organization of the details related to the at least one known mobile node with the captured details related to the at least one unknown mobile node and the organization of the captured details related to the at least one unknown mobile node;
    determining a type of the at least one unknown mobile node based on the comparing of the details related to the at least one known mobile node and the organization of the details related to the at least one known mobile node with the captured details related to the at least one unknown mobile node and the organization of the captured details related to the at least one unknown mobile node;
    identifying those unknown mobile nodes from the at least one unknown mobile node having identical details;
    identifying, from those unknown mobile nodes having identical details, a set of unknown mobile nodes having different media access control (MAC) addresses;
    determining, from the set of unknown mobile nodes having different MAC addresses, whether any unknown mobile nodes have random MAC addresses;
    if it is determined that unknown mobile nodes from the set of unknown mobile nodes having different MAC addresses have random MAC addresses:
        tagging the unknown mobile nodes having random MAC addresses as a single unknown mobile node; and
    if it is determined that unknown mobile nodes from the set of unknown mobile nodes having different MAC addresses do not have random MAC addresses:
        tagging the unknown mobile nodes having random MAC addresses as separate unknown mobile nodes.

2. The method of claim 1, wherein at least one of the details related to the at least one known mobile node and the details related to the at least one unknown mobile node is captured by a network protocol analyzer.

3. The method of claim 1, further comprising:
    obtaining known data about the at least one known mobile node; and
    creating a fingerprint database, the fingerprint database comprising the organized details related to the at least one known mobile node and the obtained known data about the at least one known mobile node.

4. The method of claim 3, wherein comparing the details related to the at least one known mobile node and the organization of the details related to the at least one known mobile node with the captured details related to the at least one unknown mobile node and the organization of the captured details related to the at least one unknown mobile node comprises:
    comparing the details related to the at least one unknown mobile node and the organization of the details related to the at least one known mobile node with the organized details related to the at least one known mobile node and the obtained known data about the at least one known mobile node stored in the fingerprint database.

5. The method of claim 1, wherein the details related to the at least one known mobile node includes at least one of an identity of a vendor of the at least one known mobile node, a model number of the at least one known mobile node, a chipset type of the at least one known mobile node, and a firmware version used in the at least one known mobile node.

6. The method of claim 1, wherein if the details related to the at least one known mobile node and the organization of the details related to the at least one known mobile node do not match the captured details related to the at least one unknown mobile node and the organization of the captured details related to the at least one unknown mobile node, further comprising outputting a list of known mobile nodes having details closest to details of the at least one unknown mobile nodes.

7. The method of claim 1, further comprising:
    storing the details related to the at least one unknown mobile node and the organization of the details related to the at least one unknown mobile node in an unknown mobile node database;
    comparing contents of the unknown mobile node database with future captured details related to other known mobile nodes and organization of the future captured details related to the other known mobile nodes;
    identifying those details related to the at least one unknown mobile node that match the future captured details related to the other known mobile nodes based on comparing the contents of the unknown mobile node database with the future captured details related to other known mobile nodes and the organization of the future captured details related to the other known mobile nodes; and
    updating the contents of the unknown mobile node database to include the identified details.

8. The method of claim 1, wherein the details related to the at least one known mobile node are captured from a probe request transmitted by the at least one known mobile node and the details related to the at least one unknown mobile node are captured from another probe request transmitted by the at least one unknown mobile node.

9. The method of claim 1, wherein if a match is found between (A) the details related to the at least one known mobile node and the organization of the details related to the at least one known mobile node, and (B) the captured details related to the at least one unknown mobile node and the organization of the captured details related to the at least one unknown mobile node, further comprising:

outputting information regarding the match to at least one of a display and a file.

10. A node identification system configured to identify at least one unknown mobile node in a communications network using details related to at least one known mobile node and organization of the details related to the at least one known mobile node, the node identification system comprising:
   a communications interface configured to:
      capture details related to the at least one unknown mobile node and identifying an organization of the captured details related to the at least one unknown mobile node; and
   processing circuitry including a memory and a processor, the memory in communication with the processor, the memory having instructions that, when executed by the processor, configure the processor to:
      compare the details related to the at least one known mobile node and the organization of the details related to the at least one known mobile node with the captured details related to the at least one unknown mobile node and the organization of the captured details related to the at least one unknown mobile node;
      determine a type of the at least one unknown mobile node based on the comparing of the details related to the at least one known mobile node and the organization of the details related to the at least one known mobile node with the captured details related to the at least one unknown mobile node and the organization of the captured details related to the at least one unknown mobile node;
      identify those unknown mobile nodes from the at least one unknown mobile node having identical details;
      identify, from those unknown mobile nodes having identical details, a set of unknown mobile nodes have different media access control (MAC) addresses;
      determine, from the set of unknown mobile nodes having different MAC addresses, whether any unknown mobile nodes have random MAC addresses;
      if it is determined that unknown mobile nodes from the set of unknown mobile nodes having different MAC addresses have random MAC addresses:
         tag the unknown mobile nodes having random MAC addresses as a single unknown mobile node; and
      if it is determined that unknown mobile nodes from the set of unknown mobile nodes having different MAC addresses do not have random MAC addresses:
         tag the unknown mobile nodes having random MAC addresses as separate unknown mobile nodes.

11. The node identification system of claim 10, wherein at least one of the details related to the at least one known mobile node and the details related to the at least one unknown mobile node is captured by a network protocol analyzer.

12. The node identification system of claim 10, wherein the processor is further configured to:
   obtain known data about the at least one known mobile node; and
   create a fingerprint database, the fingerprint database comprising the organized details related to the at least one known mobile node and the obtained known data about the at least one known mobile node.

13. The node identification system of claim 12, wherein comparing the details related to the at least one known mobile node and the organization of the details related to the at least one known mobile node with the captured details related to the at least one unknown mobile node and the organization of the captured details related to the at least one unknown mobile node comprises:
   comparing the details related to the at least one unknown mobile node and the organization of the details related to the at least one known mobile node with the organized details related to the at least one known mobile node and the obtained known data about the at least one known mobile node stored in the fingerprint database.

14. The node identification system of claim 10, wherein the details related to the at least one known mobile node includes at least one of an identity of a vendor of the at least one known mobile node, a model number of the at least one known mobile node, a chipset type of the at least one known mobile node, and a firmware version used in the at least one known mobile node.

15. The node identification system of claim 10, wherein if the details related to the at least one known mobile node and the organization of the details related to the at least one known mobile node do not match the captured details related to the at least one unknown mobile node and the organization of the captured details related to the at least one unknown mobile node, further comprising outputting a list of known mobile nodes having details closest to details of the at least one unknown mobile nodes.

16. The node identification system of claim 10, wherein the processor is further configured to:
   store the details related to the at least one unknown mobile node and the organization of the details related to the at least one unknown mobile node in an unknown mobile node database;
   compare contents of the unknown mobile node database with future captured details related to other known mobile nodes and organization of the future captured details related to the other known mobile nodes;
   identify those details related to the at least one unknown mobile node that match the future captured details related to the other known mobile nodes based on comparing the contents of the unknown mobile node database with the future captured details related to other known mobile nodes and the organization of the future captured details related to the other known mobile nodes; and
   update the contents of the unknown mobile node database to include the identified details.

17. The node identification system of claim 10, wherein if a match is found between (A) the details related to the at least one known mobile node and the organization of the details related to the at least one known mobile node, and (B) the captured details related to the at least one unknown mobile node and the organization of the captured details related to the at least one unknown mobile node, the processor is further configured to:
   output information regarding the match to at least one of a display and a file.

18. A method in a node identification system for identifying at least one unknown mobile node in a communications network using details related to at least one known mobile node and organization of the details related to the at least one known mobile node, the details related to the at least one known mobile node including at least one of an identity of a vendor of the at least one known mobile node, a model number of the at least one known mobile node, a chipset type of the at least one known mobile node, and a firmware version used in the at least one known mobile node, the method comprising:

receiving a probe request from at least one unknown mobile node;

capturing details from the received probe request related to the at least one unknown mobile node and identifying an organization of the captured details related to the at least one unknown mobile node;

comparing the details related to the at least one known mobile node and the organization of the details related to the at least one known mobile node with the captured details related to the at least one unknown mobile node and the organization of the captured details related to the at least one unknown mobile node;

determining a type of the at least one unknown mobile node based on the comparing of the details related to the at least one known mobile node and the organization of the details related to the at least one known mobile node with the captured details related to the at least one unknown mobile node and the organization of the captured details related to the at least one unknown mobile node;

identifying those unknown mobile nodes from the at least one unknown mobile node having identical details;

identifying, from those unknown mobile nodes having identical details, a set of unknown mobile nodes having different media access control (MAC) addresses;

determining, from the set of unknown mobile nodes having different MAC addresses, whether any unknown mobile nodes have random MAC addresses;

if it is determined that unknown mobile nodes from the set of unknown mobile nodes having different MAC addresses have random MAC addresses:

tagging the unknown mobile nodes having random MAC addresses as a single unknown mobile node; and if it is determined that unknown mobile nodes from the set of unknown mobile nodes having different MAC addresses do not have random MAC addresses:

tagging the unknown mobile nodes having random MAC addresses as separate unknown mobile nodes.

\* \* \* \* \*